(12) United States Patent
Blythe et al.

(10) Patent No.: US 12,152,530 B2
(45) Date of Patent: *Nov. 26, 2024

(54) TURBINE-COMPRESSOR ASSEMBLY AND METHOD

(71) Applicant: Transportation IP Holdings, LLC, Norwalk, CT (US)

(72) Inventors: Neil Xavier Blythe, Erie, PA (US); Pradheepram Ottikkutti, Lawrence Park, PA (US); Rogier Giepman, Garching (DE); Michael Majewski, Erie, PA (US); Kevin McElhaney, Edinboro, PA (US); Najeeb Kuzhiyil, McKinney, TX (US); Adam Edgar Klingbeil, Ballston Lake, NY (US); Adam C. Felton, Grove City, PA (US); Christopher Joseph Homison, Wattsburg, PA (US); Roy James Primus, Williamsburg, VA (US); Thomas Michael Lavertu, Ballston Lake, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,596

(22) Filed: May 8, 2023

(65) Prior Publication Data
US 2023/0272737 A1 Aug. 31, 2023

Related U.S. Application Data

(63) Continuation-in-part of application No. 17/836,015, filed on Jun. 9, 2022, now Pat. No. 11,680,517, and
(Continued)

(51) Int. Cl.
*F02B 37/14* (2006.01)
*F01N 5/04* (2006.01)
*F02D 41/00* (2006.01)

(52) U.S. Cl.
CPC ............... *F02B 37/14* (2013.01); *F01N 5/04* (2013.01); *F02D 41/0007* (2013.01)

(58) Field of Classification Search
CPC .......... F02B 37/14; F02B 37/04; F02B 37/10; F02B 37/18; F02B 39/10; F01N 5/04; F02D 41/0007; Y02T 10/12
(Continued)

(56) References Cited

U.S. PATENT DOCUMENTS 6,378,307 B1 * 4/2002 Fledersbacher ......... F02B 37/12
60/602
7,870,731 B2 1/2011 Fledersbacher et al.
(Continued)

*Primary Examiner* — Hoang M Nguyen
(74) *Attorney, Agent, or Firm* — K&L Gates LLP

(57) ABSTRACT

A turbine-compressor assembly includes a turbine-compressor device fluidly coupled with a heat source, a compressor, and a turbine via plural valves. A power device is coupled with the turbine-compressor device via a shaft. A controller can control operation of the plural valves to control the movement of fluids within the assembly to selectively switch between the turbine-compressor device operating in one of plural operating modes. In a first mode of operation, the turbine-compressor device can generate electrical power and direct the electrical power to the power device to control an amount of power provided to or extracted from the shaft by the power device. In a second mode of operation, the turbine-compressor device can receive electrical power from the power device to consumer the electrical power.

20 Claims, 6 Drawing Sheets

Related U.S. Application Data a continuation-in-part of application No. 17/448,342, filed on Sep. 21, 2021, now Pat. No. 11,643,963, said application No. 17/836,015 is a continuation-in-part of application No. 17/200,489, filed on Mar. 12, 2021, now Pat. No. 11,359,558, which is a continuation-in-part of application No. 16/713,266, filed on Dec. 13, 2019, now Pat. No. 10,961,902.

(60) Provisional application No. 62/804,935, filed on Feb. 13, 2019.

(58) Field of Classification Search
USPC .................................................. 60/605.1–612
See application file for complete search history.

(56) References Cited

U.S. PATENT DOCUMENTS

| | | | |
|---|---|---|---|
| 8,813,494 B2* | 8/2014 | Hofer | F02B 37/005 |
| | | | 60/624 |
| 9,581,095 B2 | 2/2017 | Purisfull | |
| 10,337,347 B2 | 7/2019 | Mischler et al. | |
| 10,961,902 B2* | 3/2021 | Blythe | F01N 5/04 |
| 11,359,558 B2* | 6/2022 | Blythe | F02B 39/10 |
| 11,680,517 B2* | 6/2023 | Blythe | F02B 37/02 |
| | | | 60/773 |
| 2010/0089056 A1 | 4/2010 | Cooper et al. | |
| 2016/0076469 A1* | 3/2016 | Pursifull | F02M 35/10222 |
| | | | 123/519 |
| 2019/0234272 A1 | 8/2019 | Harmsen et al. | |
| 2020/0173344 A1 | 6/2020 | Punjanl et al. | |
| 2020/0224614 A1 | 7/2020 | Hu et al. | |
| 2020/0271046 A1 | 8/2020 | Kelly et al. | |

\* cited by examiner

TURBINE-COMPRESSOR ASSEMBLY AND METHOD

CROSS-REFERENCE TO RELATED APPLICATIONS

This application is a continuation-in-part of U.S. patent application Ser. No. 17/836,015, which was filed on Jun. 9, 2022, which is a continuation-in-part of U.S. patent application Ser. No. 17/200,489, which was filed on Mar. 12, 2021 and issued as U.S. Pat. No. 11,359,558 on Jun. 14, 2022, which is a continuation-in-part of U.S. patent application Ser. No. 16/713,266, which was filed on Dec. 13, 2019 and issued as U.S. Pat. No. 10,961,902 on Mar. 30, 2021, which claims priority to U.S. Provisional Application No. 62/804,935, which was filed on Feb. 13, 2019.

This application is also a continuation-in-part of U.S. patent application Ser. No. 17/448,342, which was filed on Sep. 21, 2021.

The entire disclosures of which are incorporated herein by reference.

BACKGROUND

Technical Field

Embodiments of the subject matter described herein relate to controlling operation of a powered system, such as a vehicle system.

Discussion of Art

Turbochargers can increase power output of a reciprocating engine by increasing the pressure and flow rate of intake air to burn more fuel efficiently within constraints of regulated emission levels. The compressor of a turbocharger is driven by the turbine using energy extracted from exhaust gases of the engine. The compressor is mechanically coupled to the turbine via a solid shaft or a clutch drive or system. Vehicles systems or other powered systems can include turbocharged engine systems that include radial turbines attached to an electric generator. The generator extracts energy from exhaust gases of the reciprocating engine system that would otherwise be wasted with exhaust gases vented out of the powered system. However, turbochargers are limited in the amount of energy extracted due to mechanical and thermal limitations of both the turbine and the compressor.

As one alternative, additional energy may be extracted from the exhaust gas by adding a second turbine downstream from the first turbine forming a two-stage turbocharger. The second stage turbine may be used to drive the first stage compressor, and the first stage turbine may be used to drive the second stage compressor. The second stage turbine and the first stage compressor may refer to a low-pressure turbocharger, and the first stage turbine and the second stage compressor may refer to a high-pressure turbocharger, As another alternative, the downstream turbine may be used to drive an electrical generator that feeds electrical power into an electrical power plant, into an energy storage device, to feed supplemental power to traction motors, or the like. However, the single stage and double stage turbochargers have limited benefit at low engine loads and low engine speeds where the amount of available exhaust energy is reduced. It may be desirable to have a system and method that differs from those that are currently available.

SUMMARY

In accordance with one example or aspect, a turbine-compressor assembly is provided that includes a turbine-compressor device fluidly coupled with a heat source, a compressor, and a turbine via plural valves; a power device coupled with the turbine-compressor device; and a controller that can control operation of the plural valves to control the movement of fluids within the assembly to selectively switch between the turbine-compressor device operating in one of plural operating modes. In a first mode of operation, the turbine-compressor device can selectively generate a determined amount of electrical power. In a second mode of operation, the turbine-compressor device can selectively receive electrical power a determined amount of electrical power.

In accordance with one example or aspect, a method is provided that includes operating a turbine-compressor assembly in a first mode of operation or a second mode of operation. In the first mode of operation electrical power is directed to a power device, and thereby a speed of turbine-compressor assembly is increased. In the second mode of operation, receiving electrical power generated by the power device at the turbine-compressor device, and thereby the speed of the turbine-compressor assembly is decreased.

Apart from switching from one operating mode to another, within an operating mode, the controller can select how much power to extract or to provide to the power device coupled to the turbine shaft. Thus, the speed at which the shaft rotation is increased (supplying power) or is decreased (extracting power) is controllable.

In accordance with one example or aspect, a turbine-compressor assembly of a system may include an engine with an upstream valve fluidly coupled with both a compressor and a turbine-compressor device, a downstream valve fluidly coupled with a turbine and the turbine-compressor device, and a controller that can control the upstream valve, the downstream valve, and a control valve that is coupled with the upstream valve, the downstream valve, and the turbine-compressor device. The controller may selectively operate the turbine-compressor device in a plurality of operating modes In a first mode of operation, the upstream valve may be controlled to direct inlet air to the compressor, the turbine is controlled to receive engine exhaust, the downstream valve is controlled to direct first turbine exhaust from the turbine to the turbine-compressor device, and the control valve is controlled to direct second turbine exhaust from the turbine-compressor device to an outlet of the system. In a second mode of operation, the control valve may be controlled to direct the inlet air to the turbine-compressor device, the upstream valve is controlled to direct first compressed air from the turbine-compressor device to the compressor, and the downstream valve is controlled to direct the first turbine exhaust from the turbine to the outlet of the system.

In accordance with one example or aspect, a method may include switching between operating a turbine-compressor assembly of a system at least in a first mode of operation and a second mode of operation. In the first mode of operation, directing inlet air to a compressor, receiving engine exhaust at a turbine, directing first turbine exhaust from the turbine to a turbine-compressor device, and directing second turbine exhaust from the turbine-compressor device to an outlet of the system. In the second mode of operation, directing the inlet air to the turbine-compressor device, directing first compressed air from the turbine-compressor device to the compressor, and directing the first turbine exhaust from the turbine to the outlet of the system.

In accordance with one example or aspect, a turbine-compressor assembly of a vehicle system having an engine may include a valving system coupled with a compressor, a turbine, and a turbine-compressor device, a power device coupled with the turbine-compressor device, and a controller that may control the valving system to selectively switch between two or more operating modes of the turbine-compressor device. In a first mode of operation, the valve system may direct inlet air to the compressor, the turbine can receive engine exhaust, direct first turbine exhaust from the turbine to the turbine-compressor device, direct second turbine exhaust from the turbine-compressor device to an outlet of the vehicle system, and generate electrical power for the power device. In a second mode of operation, the valve system may direct the inlet air to the turbine-compressor device, direct first compressed air from the turbine-compressor device to the compressor, direct the first turbine exhaust from the turbine to the outlet of the vehicle system, and consume electrical power of the power device to compress the inlet air by the turbine-compressor device.

In accordance with one example or aspect, a turbine-compressor assembly may include a turbine-compressor device fluidly coupled with a heat source, a compressor, and a turbine via plural valves. A power device may be coupled with the turbine-compressor device. A controller may control operation of the plural valves to control movement of fluids within the assembly to selectively switch between the turbine-compressor device operating in one of plural modes. In a first mode of operation, the turbine-compressor device may generate electrical power and direct the electrical power to the power device. In a second mode of operation, the turbine-compressor device may receive electrical power from the power device to consume the electrical power.

In accordance with one example or aspect, a method may include operating a turbine-compressor assembly in a first mode of operation or a second mode of operation. In the first mode of operation, electrical power may be generated with a turbine-compressor device, and directed to a power device. In the second mode of operation, electrical power generated by the power device may be received at the turbine-compressor device which may consume the electrical power generated by the power device.

In accordance with one example or aspect, an expander-compressor assembly may include a valve system coupled with a compressor, an expander, a heat source, and a device. The valve system may direct plural fluids in plural directions toward one or more of the compressor, the expander, or the device. A power device may be coupled with the device, and a controller may control the valve system to selectively switch between the device operating in one of plural operating modes. In an expander mode of operation, the valve system may control movement of the plural fluids to operate the device as a power-generating device to generate electrical power for the power device. In a second mode of operation, the valve system may control movement of the plural fluids to operate the device as a power-consuming device. The device may consume electrical power received from the power device.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
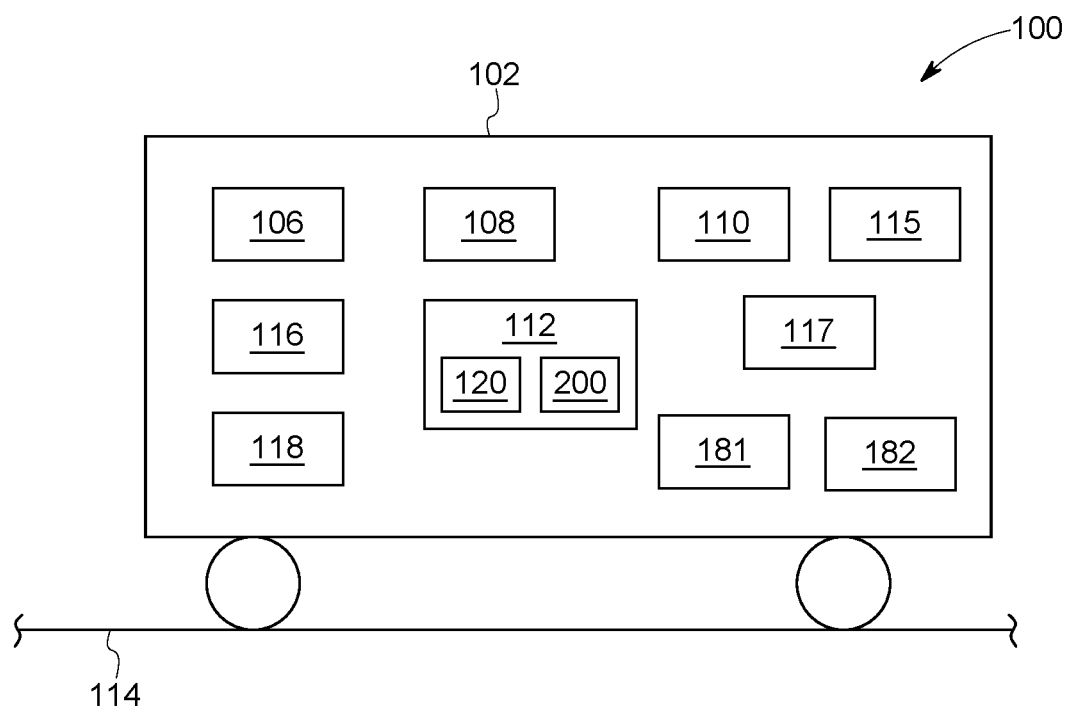
FIG. 1 illustrates one embodiment of a vehicle system.

One or more embodiments of the inventive subject matter described herein provide systems and methods for operating a turbine-compressor assembly of a vehicle system. Vehicle systems or other powered systems can include turbo engine systems that include radial turbines attached to a generator to extract energy from exhaust gases of the turbo engine system that would otherwise be wasted with exhaust gases vented out of the vehicle. Optionally, the vehicle and/or powered systems may include other heat sources (e.g., gas turbines, fuel cells, waste heat recovery systems, or the like), that may generate heat that may be wasted with exhaust gases.

In one embodiment, the current disclosure provides for a system for a vehicle that has an electric turbine-compressor assembly. The turbine-compressor assembly, or turbocharger, has a compressor, an exhaust turbine coupled to the compressor via a shaft, and an electric machine mechanically coupled to the shaft. A controller can adjust an amount of power provided to or extracted from the shaft by the electric machine based on at least one of a speed of the electric turbocharger, a cylinder pressure, and an exhaust gas temperature and/or pressure. For example, the amount of power provided to the shaft by the electric machine may be increased in response to the exhaust gas temperature increasing above an upper threshold temperature while the speed of the electric turbocharger is less than a threshold speed and the cylinder pressure is less than a threshold pressure. As another example, the amount of power provided to the shaft by the electric machine may be decreased in response to at least one of the exhaust gas temperature decreasing below a lower threshold temperature, the cylinder pressure increasing above the threshold pressure, and the speed of the electric turbocharger increasing above the threshold speed. As a further example, the amount of power extracted from the shaft by the electric machine may be increased in response to at least one of the exhaust gas temperature decreasing below the lower threshold temperature and the speed of the electric turbocharger increasing above the threshold speed, he cylinder pressure increasing above the threshold pressure, and the amount of power extracted from the shaft by the electric machine may be decreased in response to the exhaust gas temperature increasing above the upper threshold temperature while the speed of the electric turbocharger is less than the threshold speed.

By adjusting the amount of power provided to or extracted from the shaft by the electric machine based on at least one of the speed of the electric turbocharger, the cylinder pressure, and the exhaust gas temperature, an efficiency of the system may be increased while exhaust gas emissions are decreased. For example, the energy extracted by the electric machine may be harvested by the vehicle for a fuel benefit and/or an amount of energy wasted as exhaust heat may be recovered. An additional benefit is that a rate of degeneration of one or more components of an exhaust system of the vehicle may be lowered.

While one or more embodiments are described in connection with a rail vehicle system, not all embodiments are limited to rail vehicle systems. Suitable vehicle types may include automobiles, trucks (with or without trailers), buses, marine vessels, aircraft, mining vehicles, agricultural vehicles, or other off-highway vehicles. The vehicle systems described herein can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

A turbine-compressor assembly including a turbine-compressor device may be used to increase the utilization of the exhaust turbine generator and facilitate increased air pressure at reduced loads or transient conditions. At increased loads, exhaust energy may drive the turbine-compressor device in a first direction, thereby operating the device as a turbine. At increased loads, the turbine-compressor assembly operates in a first mode of operation. At reduced loads or transient conditions, the electrical power from the generator may be reversed and used to drive the turbine-compressor device in an opposite direction, thereby operating the device as a compressor. At the reduced loads, the turbine-compressor assembly operates in a second mode of operation.

In controlling the direction of electrical power from the generator, the vehicle system can control one or more valves of the turbine-compressor assembly to change the direction of flow of fluids (e.g., inlet air, compressed air, engine exhaust or exhaust from a heat source, turbine exhaust, or the like) based on the turbine-compressor assembly operating in the first mode or second mode of operation.

One or more embodiments of the inventive subject matter described herein provide a turbine-compressor assembly of a system that includes an upstream valve, a downstream valve, and a control valve fluidly coupled between a turbine, a compressor, and a turbine-compressor device. The turbine-compressor assembly may operate in a first mode of operation or in a second mode of operation. While operating in the first mode of operation, the upstream valve directs inlet air to the compressor, the turbine receives engine exhaust, the downstream valve directs first turbine exhaust from the turbine to the turbine-compressor device, and the control valve directs second turbine exhaust from the turbine-compressor device to an outlet of the system.

While operating in the second mode of operation, the control valve directs the inlet air to the turbine-compressor device, the upstream valve directs compressed first compressed air from the turbine-compressor device to the compressor, and the downstream valve directs the first turbine exhaust from the turbine to the outlet of the system. As described herein, the turbine-compressor assembly can increase the amount of compressed air pressure provided to the engine responsive to the system operating at reduced loads or transient conditions and the turbine-compressor assembly is operating in the second mode of operation, can increase the efficiency of the engine, and can reduce the amount or constituency of emissions expelled from the vehicle system.

The vehicle system described herein can be formed from a single vehicle or from two or more vehicles (propulsion-generating vehicles and/or non-propulsion generating vehicles) traveling together as a consist. With respect to two or more vehicles, they may be mechanically coupled with each other, such as by couplers, or may be separate from each other but communicate with each other so that they can coordinate the respective movements to travel together as a system. Suitable vehicles may be rail vehicles (e.g., locomotives, shunters, switchers, and/or rail cars). Other suitable vehicles may be automobiles, trucks, buses, mining vehicles, industrial equipment, marine vessels, aircraft, or the like. Alternatively, the inventive system may be useful in a stationary powered system. For example, the powered system may be a power plant, or the like. The duty cycle and demands on a vehicle differ from those placed on a stationary application.

FIG. 1 illustrates one embodiment of a vehicle system 100. The vehicle system may be referred to herein as a powered system. The vehicle system is shown and described as a single vehicle 102 that travels along a route 114 In the illustrated embodiment, the vehicle is a locomotive that may move or travel along a track. Other suitable vehicles may include mining equipment, marine vessels, on-road trucks and cars, industrial and construction equipment, manned and unmanned aerial vehicles, or the like. In other embodiments, rather than a vehicle the inventive system may be deployed in a stationary powered system that may be powered by a turbine engine system. Different devices onboard and/or off-board the vehicle may communicate with and/or among each other to control operations of the vehicle system. Optionally, the devices onboard the vehicle may also communicate with other devices off-board the vehicle.

The vehicle may include a brake system 108 that slows or stops movement of the vehicle. A controller 110 may communicate with and/or control various components of the vehicle, including the brake system and/or the retarder of the engine system responsive to its use. The brake system may represent air brakes, friction brakes, regenerative brakes (e.g., that include one or more traction motors of a propulsion system 112 of the vehicle), or the like. In one embodiment, the brake system may include a pressure vessel as part of the air brake system. In another embodiment, the brake system may include a jake brake or engine retarder. Optionally, one or more components, sensors, systems, or the like, that may be disposed onboard the vehicle or may be disposed or deployed among plural different vehicles of the vehicle system.

The controller represents hardware circuitry that includes and/or is connected with one or more processors (e.g., one or more microprocessors, field programmable gate arrays, integrated circuits, or the like) that operate to control movement of the vehicle. The controller may receive input from an operator onboard and/or off-board the vehicle, onboard a different vehicle of the vehicle system, or off-board the vehicle system via one or more input and/or output devices 116 and, based on the input, change the propulsion force or effort (e.g., torque, power, output, tractive effort, or the like) generated by the propulsion system and/or may change the braking force or effort generated by the brake system. The input and/or output devices can be touchscreens, display devices, keyboards, pedals, levers, switches, buttons, microphones, speakers, or the like, that receive information from an operator and/or provide information to the operator onboard the vehicle.

The vehicle is propelled by the propulsion system that represents one or more engines, alternators, generators, traction motors, gear boxes (e.g., holding gears that translate rotary motion created by an engine or motor into rotary motion of the wheels and/or axles of the vehicle). The propulsion system may be supplied with fuel from a fuel source 118, such as a tank of fuel.

One or more sensors 120 may monitor aspects of the propulsion system, as well as other systems of the vehicle. That is, the sensors may measure one or more parameters of the propulsion system and/or of the vehicle. For example, a suitable sensor may measure the speed at which one or more wheels of the vehicle is moving, may be a location sensor that includes a global positioning system (GPS) receiver, wireless transceiving equipment (e.g., that triangulates locations of the vehicle), or the like. The sensors may measure one or more operating parameters of the turbine-compressor assembly, such as air-to-fuel ratios, exhaust temperatures, engine loads, the rate of fuel flow, engine speed, emissions rates, fuel consumption, pressure(s) at a heat source (e.g., an engine or other heat generating device), or the like. As noted above, one or more sensors may be a location sensor that determines a location of the vehicle. The sensors may measure the one or more parameters at scheduled times or locations, continuously, randomly, at patterned intervals, or the like, as the vehicle moves along the route. Other suitable sensors may be weather sensors (e.g., thermometers, barometers, hygrometers, rain gauges, or the like), air quality measuring devices, or the like.

In one or more embodiments, the vehicle system may communicate with a controller or a back-office server such as an off-board database (not shown) off-board the vehicle system. One or more functions or operations of the vehicle system may be controlled by the back-office server instead of by an operator on-board the vehicle system, or by one or more processors onboard the vehicle system. The off-board database may represent the back-office server of a positive train control system. Alternatively, the off-board database may represent another computerized system that communicates with vehicle systems or powered systems described herein. As one example, the back-office server may communicate with the vehicle system and other powered systems traveling within an area associated with the back-office server. The back-office server can monitor the status of routes and/or vehicle systems in the associated area and communicate signals to the vehicle systems that prevent the vehicle systems from entering into identified segments of routes and/or allow the vehicle systems to enter into the identified segments of the routes. The back-office server can represent hardware circuitry that includes and/or is connected with one or more processors and transceiving hardware (e.g., a communication device as described herein).

The vehicle system may include an aftertreatment system 117 coupled in an exhaust passage downstream of a turbocharger (not shown in FIG. 1). In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, a three-way catalyst, a NOx trap, or various other devices or systems. In one example, an aftertreatment temperature sensor 115 may be arranged at or upstream of an inlet of the aftertreatment system, which may measure a temperature of exhaust gas prior to entering the aftertreatment system. Additionally, one or more AFR sensors or oxygen (O2) sensors may be arranged on an exhaust conduit upstream and/or downstream of the aftertreatment system. For example, an AFR sensor or O2 sensor 181 may be arranged at the inlet of the aftertreatment system, which may estimate an AFR of the engine from the exhaust gas prior to entering the aftertreatment system, or an AFR sensor or O2 sensor 182 may be arranged downstream of the aftertreatment system (e.g., at an exhaust pipe), which may estimate an AFR of the exhaust gas exiting the aftertreatment system.

Catalysts, such as DOCs, are shown to exhibit increased (e.g., peak) conversion of exhaust gas components at a particular exhaust gas temperature. As such, for reducing vehicle emissions, it may be desirable to maintain the exhaust temperature within a range of temperatures enabling efficient conversion of exhaust gas components by the catalyst used in the exhaust gas aftertreatment system. For example, no oxidation or conversion may occur at low exhaust gas temperatures (e.g., below approximately 120° C.). As a temperature of the catalyst in the aftertreatment system increases, the oxidation or conversion rates may increase. As the catalyst temperature is raised above a threshold temperature (e.g., 150° C.), also referred to herein as a light-off temperature of the catalyst, the conversion rates may increase steeply with increasing temperature until a plateau is reached. As such, it may be desirable to maintain the exhaust gas temperature above the plateau temperature, such as within a range in which typical exhaust gas aftertreatment systems exhibit near maximum conversion efficiency (e.g., 250-350° C.) in order to reduce vehicle emissions. However, very high temperatures (e.g., greater than 750° C.) may cause catalyst degradation. For example, sintering may occur, resulting in a loss of surface area that reduces the ability of the aftertreatment system to convert the exhaust system components. The temperatures may be selected with reference to the particular aftertreatment component and catalyst formulation, which may have different lower and upper temperatures relative to each other for their optimal operation.

The temperature of the exhaust gases entering the aftertreatment system may be monitored, adjusted and affected by the controller. The controller may ensure that an efficiency of the aftertreatment is increased while catalyst degradation is decreased. The controller may account for exhaust gas temperature as a result of engine operation and of the turbocharger assembly. For example, vehicle or engine operation may be optimized to a relatively lower exhaust gas temperature, while aftertreatment components may be optimized to a relatively higher exhaust gas temperature. The controller may then balance the conflicting interests, and decide on a target exhaust gas temperature that is one (or the other) optimal temperatures, or may find a balanced temperature between the two. The target temperature may be the median difference in optimal temperatures, or the controller may weight one operation parameter more relative to another. In such an example, the controller may lower the exhaust gas temperature to conserve fuel, reduce wear and damage to engine components or such, at the expense of optimizing the aftertreatment capabilities. Or, the controller may be configured to balance the other way.

In another example, NOx reduction may be achieved via control of the air flow to the engine. However, such a change in air flow may increase an amount of boost demanded from the turbocharger, and so operation of the turbocharger may be adjusted to decrease vehicle emissions. In one example, the aftertreatment temperature sensor further comprises composition sensors. Suitable sensors may include hydrocarbon, NOx, or carbon monoxide sensors. Depending on the signals from the aftertreatment temperature sensor, the controller may execute various instructions to raise, lower, or maintain the exhaust gas temperature.

The turbine-compressor assembly may be monitored and adjusted to control the temperature of the exhaust gases, a speed of the turbine-compressor assembly shaft, and a cylinder pressure. For example, in response to operating with one or more of the exhaust gas temperature below a lower threshold temperature, the turbine-compressor assembly shaft speed above a threshold speed, and the cylinder pressure above a threshold pressure, the controller may increase an amount of energy extracted by the electric machine, which decreases a remaining portion of energy used to mechanically power the compressor of the turbocharger. At least a portion of the extracted energy may be used to power the alternator or to power the wheels via the electric traction motors, for example. As a result of the decreased power supplied to the compressor, the turbine-compressor assembly shaft speed may decrease and an overall airflow to the engine may decrease, resulting in a decreased cylinder pressure and an increase in the temperature of the exhaust gases flowing through the aftertreatment system. Conversely, in response to operating with the exhaust gas temperature above an upper threshold temperature, the controller may increase an amount of energy supplied by the electric machine in order to increase the speed of the turbine-compressor assembly shaft, and thus increase the work output of the compressor and the air flow provided to the engine. As a result of the increased air flow to the engine, the exhaust gas temperature may be decreased.

In yet another example, the wastegate may be adjusted to increase or decrease the flow of exhaust gases through the turbine. As the flow of exhaust gases through the turbine is increased, a temperature of the exhaust gases may be reduced and the speed of the turbine-compressor assembly shaft may be increased. Alternatively, as the flow of exhaust gases through the turbine is decreased, the temperature of the exhaust gases may increase and a speed of the turbine-compressor assembly shaft may decrease. Thus, by opening or closing the wastegate, thereby decreasing or increasing, respectively, the exhaust flow through the turbine, the temperature of the exhaust gases entering the aftertreatment system may be at least partially controlled to maintain the exhaust gases within the temperature range at which an efficiency of the aftertreatment system is increased. However, using the wastegate to control the exhaust gas temperature may be less efficient than adjusting the turbine-compressor assembly via the electric machine, as no power is extracted via the wastegate.

The vehicle system optionally may include an exhaust gas recirculation (EGR) system coupled to the engine (not shown). The EGR system may route exhaust gas from the exhaust passage of the engine, downstream of the turbine, to the intake passage, upstream of the compressor. In some embodiments, the exhaust gas recirculation system may be coupled exclusively to a group of one or more donor cylinders of the engine (also referred to as a donor cylinder system).

The controller may receive information from a plurality of sensors and may send control signals to a plurality of actuators. The controller, while overseeing control and management of the vehicle, may receive signals from a variety of engine sensors. The signals may be used to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the turbine inlet temperature sensor, or the exhaust temperature entering the aftertreatment system, as determined from the aftertreatment temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, the throttle, the compressor bypass valve (or an engine bypass valve in alternate embodiments), the wastegate, or the like. Other actively operating and controlling actuators may be coupled to various locations in the vehicle.

The controller may monitor one or more vehicle operating conditions, such as an engine throttle setting. This may be performed with or for an engine governor. A suitable engine governor may react to the engine throttle setting in order to adjust engine operation. Other vehicle operating conditions may include an engine speed and load, a cylinder pressure, a vehicle speed, a turbine or turbocharger shaft speed, a transmission oil temperature, an exhaust gas flow rate, an exhaust gas temperature, a mass air flow rate, a coolant temperature, a coolant flow rate, engine oil pressures (e.g., oil gallery pressures), operating modes of one or more intake valves and/or exhaust valves, electric traction motor velocity, a state of charge (SOC) of an energy storage device, an engine torque or power output, and a vehicle wheel torque. In one embodiment, the throttle setting may be infinitely adjustable. In one embodiment, an operator of the vehicle may adjust an input device between a plurality of determined engine notch settings. Based on the selected engine notch setting, the controller may adjust engine operation to provide the desired engine performance (e.g., such as a desired vehicle speed). As an example, the plurality of engine notch settings may include a notch 0, a notch 1, a notch 2, a notch 3, a notch 4, a notch 5, a notch 6, a notch 7, and a notch 8. An increase in the numerical value of the notch may correspond (directly or indirectly) with an increase in vehicle speed and/or with engine power output. It may further make adjustments to fuel injection timing and fuel rail pressure. For example, notch 0 may correspond to not moving the locomotive, notch 4 may provide a mid-level of speed, and notch 8 may be the maximum speed setting. For example, the controller may adjust engine revolutions per minute (RPM), gearing, valve timings, and other parameters in order to move the vehicle at a speed corresponding to the selected engine notch. For example, the engine may be adjusted to generate more power in order to increase the vehicle speed, or to accommodate a heavy load (e.g., due to cargo and/or grade) at a lower vehicle speed.

Figure 2:
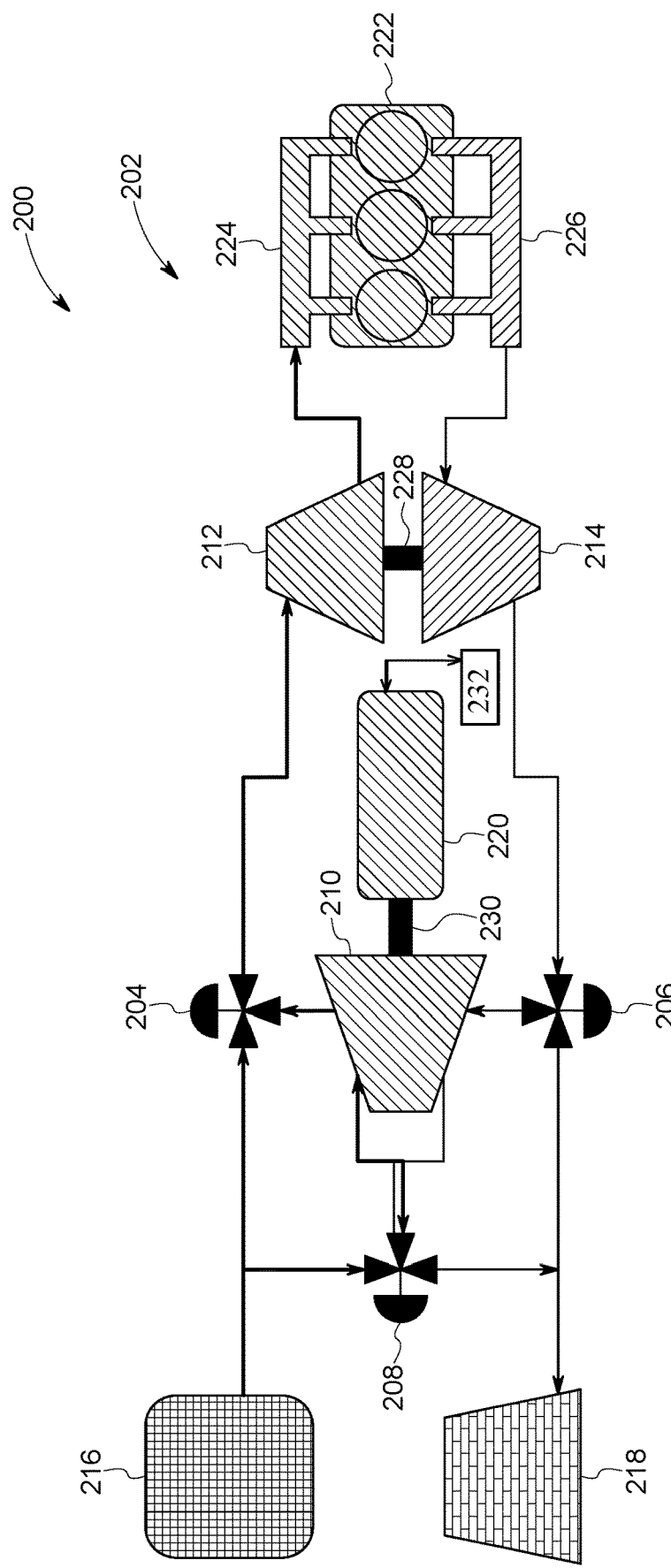
FIG. 2 illustrates one embodiment of a turbine-compressor assembly.

FIG. 2 illustrates one embodiment of the turbine-compressor assembly 200. The turbine-compressor assembly includes a turbocharger reciprocating engine system 202. Optionally, the turbine-compressor assembly may be devoid of a turbocharger engine system and rather may include an alternative heat source that may generate thermal energy (e.g., a gas turbine, fuel cells, waste heat recovery systems, or the like). A turbine-compressor assembly includes a valve system that may include an upstream valve 204, a downstream valve 206, and a control valve 208 that control the flow of fluids within the assembly. The turbine-compressor device may have a turbine 214 that is operably coupled with a compressor 212 by a shaft 228 such that the turbine provides torque to turn the compressor. In the illustrated embodiment, the compressor is a radial compressor and the turbine is a radial exhaust turbine. Optionally, the compressor may be an axial compressor, may be a plural stage axial and/or radial compressor, or the like, and the turbine may be an axial exhaust turbine, a radial exhaust turbine, or the like. The compressor and the turbine are coupled with an engine 222 via an air inlet manifold 224 and an exhaust gas outlet manifold 226, respectively. During operation, compressed air may be directed from the compressor to the engine via the inlet manifold. This may be done under pressure, and the amount of pressure may be controllable, as well as the mass volume, and other select parameters. Engine exhaust or heat source exhaust is directed from the engine to the turbine. This may be done via the outlet manifold.

In the illustrated embodiment, the engine system includes only a single stage turbocharger including the compressor and the turbine. Additionally or alternatively, the engine system may include a second turbine (e.g., a second stage turbine) operably coupled with a second compressor (e.g., a first stage compressor, not shown). For example, the second stage turbine may drive the first stage compressor, and the first stage turbine may drive the second stage compressor. In another example, a second stage turbine may drive a second stage compressor and a first stage turbine may drive the first stage compressor. The turbine-compressor assembly includes an inlet 216 that directs air into the assembly and an outlet 218 that directs engine or heat source exhaust out of the assembly. In alternative embodiments, the outlet may be a pressure tank, or the like, that may receive engine or heat source exhaust from the assembly that may be recycled into the braking system, the propulsion system, an alternative compressed air system, or the like.

The turbine-compressor device is fluidly coupled with the compressor and the turbine. The turbine-compressor assembly may operate in either a first mode of operation or in a second mode of operation. For example, the turbine-compressor device may be operably coupled with one or more processors of the vehicle system (of FIG. 1) via a switch. The one or more processors may change the position of the switch to direct the turbine-compressor device to operate as a turbine (e.g., in the first mode of operation) or as a compressor (e.g., in the second mode of operation) by changing the direction of rotation of a single turbine/compressor wheel or fan (not shown) of the turbine-compressor device and/or by changing the direction of electrical power flow (e.g., the electrical power that flows to the device when operating in the hybrid-second mode and electrical power that flows out or away from the device when operating in the hybrid-first mode). For example, the turbine-compressor device may include a single wheel that may be used alternatively as a turbine or as a compressor, as opposed to having separate turbine and compressor wheels. Alternatively, the turbine-compressor device may include one or more valves that control the direction of flow of electrical power in and/or out of the device to control which mode of operation the device may operate. For example, the turbine-compressor device may be devoid a wheel and may be unable to change direction of rotation of the wheel to change the mode of operation of the device.

The turbine-compressor assembly may also be referred to as a turbine-compressor assembly having a turbine-compressor device that may operate as a turbine or operate as a compressor. For example, while the turbine-compressor assembly operates in the first mode of operation, the turbine-compressor device operates as the turbine. Alternatively, while the turbine-compressor assembly operates in the second mode of operation, the turbine-compressor device operates as the compressor. The controller can selectively switch the operating modes of the turbine-compressor device based at least in part on various input parameters.

In one or more embodiments, the turbine-compressor device may be an alternative positive displacement device. For example, in one or more embodiments the turbine-compressor device may be referred to as an expander-compressor device, in which the device may operate as a compressor in a second mode of operation, and an expander or a positive displacement device in a second mode of operation. The expander-compressor device may be disposed within a expander-compressor assembly that may operate in different operating modes based on operating conditions of the power system in which the assembly is disposed, power needs of the power system, or the like. The positive displacement device may be or include a screw compressor, a gear compressor, a piston compressor, or the like. For example, the device operating in a first mode of operation may compress fluids, and the device operating in a second mode of operation may expand fluids.

The turbine-compressor device is manufactured from one or more materials that may be suitable for using the turbine-compressor device as the turbine or as the compressor. Suitable materials for producing the turbine-compressor device may include one or more metals, metallic alloys, ceramics, metal-ceramic composites, cermets, plastics, or the like. These materials may be selected based at least in part on their suitability for the increased operating temperatures while the turbine-compressor device operates in the first mode of operation and that may be suitable for the decreased operating temperatures while the turbine-compressor device operates in the second mode of operation. For example, while the turbine-compressor assembly operates in the first mode of operation, the operating temperature of the turbine is greater than the operating temperature of the compressor operating in the second mode of operation. The turbine-compressor device may be manufactured using materials that may be able to sustain a range of temperatures that the turbine-compressor device may experience while operating as the turbine and operating as the compressor.

The turbine-compressor device is coupled with an electrically powered motor-generator power device 220 via a shaft 230. In one or more embodiments, the power device may be referred to as an electric machine, an electric power device, or the like. The power device may operate in a generator mode of operation or in a motor mode of operation. The power device operates in the generator mode of operation while the turbine-compressor assembly operates in the first mode of operation. For example, while the power device operates in the generator mode of operation, the turbine-compressor device, operating in the first mode of operation, generates power for the power device which can be utilized to operate or run the turbine-compressor device. The generated electrical power is extracted from the shaft by the power device while the turbine-compressor device operates in the first mode of operation. The generated power may be used as supplemental power to traction motors, may be stored via an energy storage system (e.g., such as an electricity or energy storage device 232, which may represent a battery or fuel cell that is localized and integrated with the vehicle system), may feed into an electrical power plant or an energy storage device, or the like. Stored electric power can be used as needed to power the power device and to operate the power device in the motor mode and drive the power device in the second mode.

Alternatively, the power device operates in the motor mode of operation while the turbine-compressor assembly operates in the second mode of operation. For example, while the power device operates in the motor mode of operation, the turbine-compressor device, operating in the second mode of operation, consumes power from the power device. The power device operates as a motor to provide power to the turbine-compressor device operating in the second mode of operation. For example, the turbine-compressor device receives a determined amount of electrical power that is provided to the shaft by the power device.

The upstream valve is fluidly coupled with the inlet, the compressor, and the turbine-compressor device. The downstream valve is fluidly coupled with the outlet, the turbine, and the turbine-compressor device. The control valve is fluidly coupled with the upstream valve, the downstream valve, and the turbine-compressor device. The upstream valve, the downstream valve, and the control valve are operably coupled with the one or more processors of the vehicle system via plural switches. The one or more processors may change the position of each of the switches of the upstream valve, the downstream valve, and the control valve to change the flow of the fluid within the turbine-compressor assembly based on the turbine-compressor device operating in the first mode of operation or the second mode of operation.

The fluids (e.g., inlet air, compressed air, engine or heat source exhaust, turbine exhaust, or the like) move along different paths within the turbine-compressor assembly while the turbine-compressor device is operating in the first mode of operation or operating in the second mode of operation. The upstream valve, the downstream valve, and the control valve control the direction of flow of the fluids within the turbine-compressor assembly.

Figure 3:
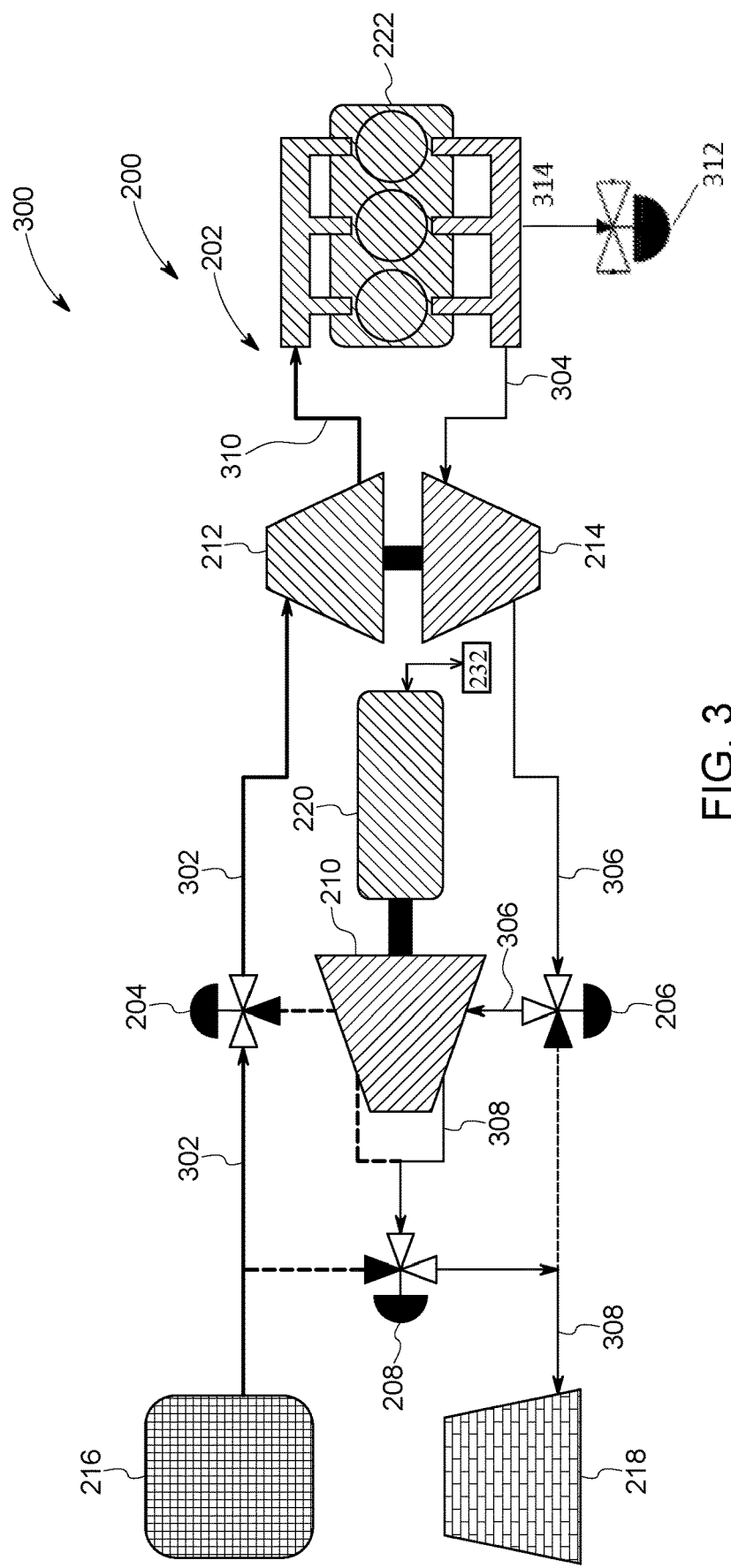
FIG. 3 illustrates one embodiment of the turbine-compressor assembly shown in FIG. 2 operating in a first mode of operation.

FIG. 3 illustrates one embodiment of the turbine-compressor assembly operating in a first mode of operation 300. While the turbine-compressor assembly operates in the first mode of operation, the turbine-compressor device operates as the turbine and the power device operates in the generator mode of operation, sending the generated electricity to the storage device or to other power consuming devices. For example, the turbine-compressor device operating in the first mode of operation generates electrical power and directs the electrical power to the power device. The storage device may receive and store at least some of the electrical power generated by the turbine-compressor device operating in the first mode of operation. In one embodiment, the device may be controlled to operate in the first mode of operation while the turbine-compressor assembly is operating at a pressure (inlet or outlet pressure at an inlet or outlet, respectively, of the head source) at the heat source (or engine) that is greater than an operator parameter value threshold.

Inlet air 302 is directed from the inlet to the upstream valve. The upstream valve directs the inlet air from the inlet to the compressor. The compressor compresses the air and directs compressed air 310 from the compressor to the inlet manifold of the engine. Engine or heat source exhaust 304 is expelled from the engine and is directed to the turbine through the exhaust gas outlet manifold. The downstream valve directs first turbine exhaust 306 from the turbine to the turbine-compressor device (e.g., operating as the turbine). The control valve directs second turbine exhaust 308 from the turbine-compressor device, to the outlet, and out of the turbine-compressor assembly.

The turbine-compressor assembly operating in the first mode of operation extracts energy from the engine or heat source exhaust and from the first turbine exhaust. For example, the turbine-compressor device extracts energy from the first turbine exhaust before the first turbine exhaust is directed to the outlet and out of the turbine-compressor assembly. Energy extracted by the turbine-compressor assembly generates power for the power device.

In one or more embodiments, the turbine or turbocharger may be a variable geometry turbocharger (VGT) or a variable flow turbocharger (VFT). For example, the turbocharger may include one or more inlet valves, interior flow control components, outlet valves, or the like, that allow the turbocharger to operate and change or control one or more characteristics of fluids moving within the turbocharger. In one or more embodiments, the controller may control an inlet of the VGT/VFT, an outlet of the VGT/VFT, and/or one or more operating conditions of the VGT/VFT to control one or more characteristics (e.g., speed, volume, turbulence, pressure, or the like) of the fluids moving into, within, and out of the turbocharger. For example, the controller may adjust and/or control an inlet area or valve of the turbocharger to control characteristics of the engine or heat source exhaust that is directed into the turbine. Optionally, the controller may control an outlet area or valve of the turbocharger to control characteristics of the first turbine exhaust that is directed out of the turbine. Optionally, the controller may adjust and/or control positions of airfoils, movable vanes, stationary vanes, or other fluid control devices (not shown) disposed within the turbine to control characteristics of the fluid that moves within the turbine.

In one or more embodiments, the VGT/VFT may be controlled based on operating conditions of the engine or heat source. For example, as the engine power level decreases, it may be desired to decrease an inlet or throat area of the VGT/VFT, to control flow characteristics of the engine exhaust that is directed into the VGT/VFT. As another example, by moving vanes within the turbine or adjusting an inlet area (throat) of the VGT/VFT, the flow of fluids into and through the turbine may increase boost provided by a current level of exhaust gas production. In another example, plural stationary nozzle vanes (not shown) of the VGT/VFT may inject various amounts of air or another fluid into a turbine nozzle to adjust an inlet area through fluidic blocking.

In one or more embodiments, the controller may monitor operating conditions of the motor-generator power device and/or the engine or heat source, and may control operation of the VGT/VFT based the operating conditions of the motor-generator power device and/or the engine or heat source. As one example, the controller may determine that the power device is not operating (e.g., has been disabled, has failed, or the like). Without the power device operating or operating correctly, the assembly may experience a reduction in back pressure that would have been generated by the power device. In one embodiment associated with the reduction in back pressure from the power device, the turbocharger may generate too much boost pressure into the engine or heat source, and the controller may control operation of the VGT/VFT to control the amount of boost pressure generated by the turbocharger.

In one or more embodiments, the turbine-compressor assembly may include a wastegate or exhaust valve 312 that may be fluidly coupled with the engine or heat source. The controller may control operation of the exhaust valve to control a second exhaust 314 (e.g., a second engine exhaust or a second heat source exhaust) that may be directed toward an outlet (not shown) of the turbine-compressor assembly and out of the assembly. As one example, the controller may determine that the power device is failing to operate correctly, has experienced a failure, has been disabled, or the like, and that the VGT/VFT may generate too much pressure. The controller may control operation of the exhaust valve to direct a portion of the second exhaust out of the engine, such as safety measure to reduce a risk of failure of the engine or heat source. Optionally, the controller may control operation of the exhaust valve to direct a portion of the second exhaust out of the assembly, and direct a portion of the engine or heat source exhaust toward the turbine. The second exhaust may be wasted or vented out of the assembly, may be directed to another assembly or system of the power system (not shown), or the like.

Figure 4:
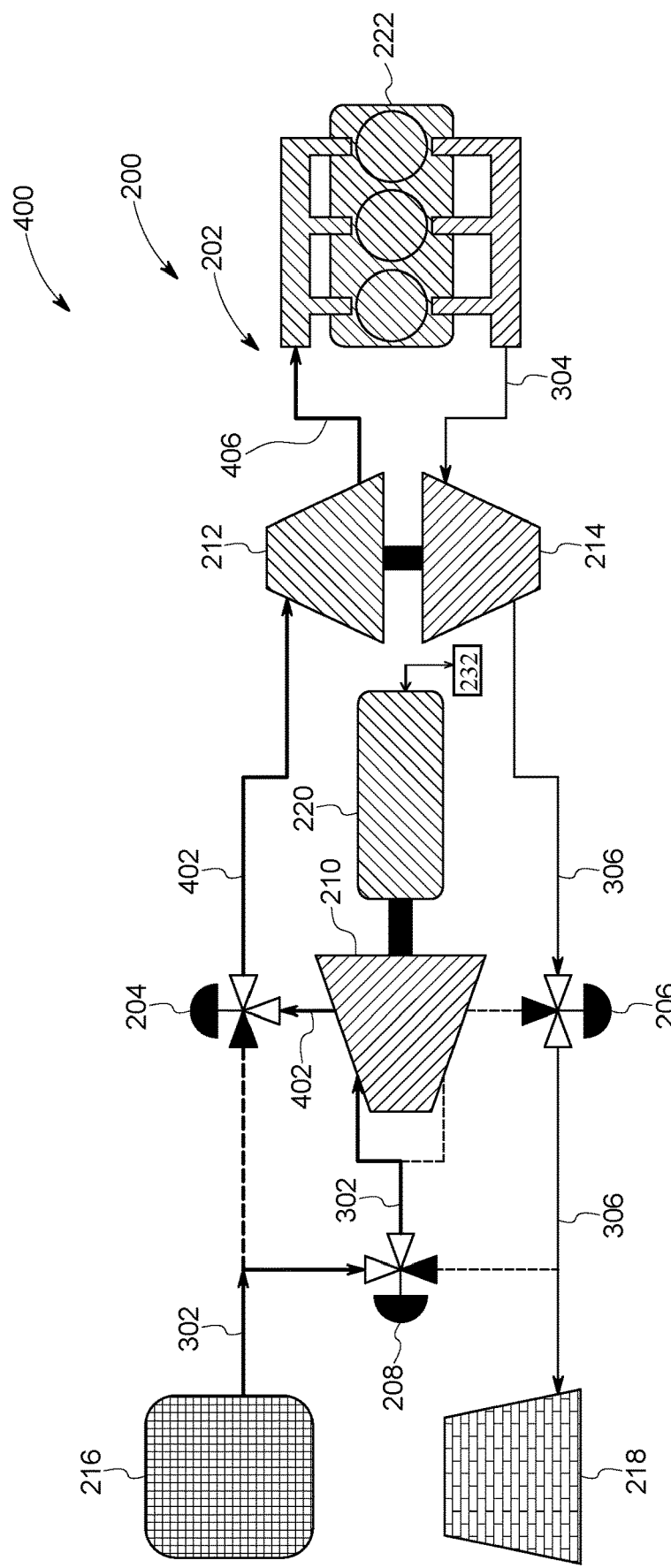
FIG. 4 illustrates one embodiment of the turbine-compressor assembly shown in FIG. 2 operating in a second mode of operation.

The controller may control operation of the wastegate and/or the VGT/VFT if conditions of the power device are not met, have been exceeded, if the power device has been disabled or has experienced a failure, or the like. As one example, the power device may be used to generate electrical energy that may be stored by the storage device. The controller may determine that the storage device may have a complete or full state of charge or has reached a determined state of charge level, and the controller may disable operation of the power device based on the storage device reaching the full or determined state of charge. The controller may control operation of the wastegate to direct at least a portion of the second exhaust out of the engine or heat source and out of the assembly based on the power device being disabled. In another embodiment, the power device may generate power for a propulsion system of the vehicle system. As one example, in operating conditions in which the vehicle is starting to move from stationary, motors of the propulsion system may require an amount of torque that may be unachievable by the power device. The controller may disable the power device, and control operation of the wastegate or exhaust valve to direct a portion of the second exhaust from the engine directly to motors (not shown) of the propulsion system. Optionally, the power device may be disabled for alternative reasons or purposes, and the controller may control operating settings of the VGT/VFT and/or the wastegate based on the power device being disabled. FIG. 4 illustrates one embodiment of the turbine-compressor assembly operating in a second mode of operation 400. While the turbine-compressor assembly operates in the second mode of operation, the turbine-compressor device operates as the compressor and the power device operates in the motor mode of operation and provides power from the storage device or other power source to drive the turbine-compressor device. For example, the turbine-compressor device operating in the second mode of operation receives and consumes electrical power from the power device. In one embodiment, the device may be controlled to operate in the second mode of operation while the turbine-compressor assembly is operating at a pressure at the heat source (or engine) that is lower than an operator parameter value threshold (e.g., an inlet pressure at an inlet of the heat source, or an outlet pressure at an outlet of the heat source). For example, if an inlet pressure of the heat source is lower than the operator parameter value threshold, the inlet pressure may be boosted by the turbine-compressor device.

Inlet air is directed from the inlet to the control valve. The control valve directs the inlet air from the inlet to the turbine-compressor device (e.g., operating as the compressor) where the inlet air is compressed. First compressed air 402 is expelled from the turbine-compressor device. The upstream valve directs the first compressed air from the turbine-compressor device to the compressor. The compressor compresses the first compressed air and directs second compressed air 406 to the inlet manifold of the engine. For example, the second compressed air has an air pressure that is greater than the air pressure of the first compressed air. The engine or heat source exhaust is expelled from the engine and is directed to the turbine. The downstream valve directs the first turbine exhaust from the turbine to the outlet and out of the turbine-compressor assembly.

The turbine-compressor assembly operating in the second mode of operation (e.g., instead of operating in the first mode of operation) changes the air flow (e.g., speed, air delivery, pressure, or the like) to the engine. For example, the turbine-compressor assembly may operate in the second mode of operation to increase the speed, pressure, or the like, of the air flow to the engine independent of the vehicle changing the engine speed, engine load, pressures at the engine or other heat source, or the like, relative to the turbine-compressor assembly operating in the first mode of operation. For example, in the second mode of operation, the controller may boost performance of the compressor using the power device while a pressure at the heat source (or engine) is below the operator parameter value threshold.

The turbine-compressor assembly may switch between operating in the first mode of operation or the second mode of operation based at least in part on one or more operating parameters of the vehicle system. The operating parameters may include, but are not limited to, the air-to-fuel ratio of the turbine engine, exhaust temperatures of the engine, exhaust temperatures of the turbine, the engine load, the engine load of each vehicle of a consist of plural vehicles, engine speed, pressure(s) at the engine or other heat source, fuel flow (e.g., pressure, fuel injection rate, fuel consumption rate, or the like), or the like. The turbine-compressor assembly may operate in the first mode of operation responsive to the vehicle and/or vehicle system operating at an operating parameter that has an operating parameter value that is greater than an operating parameter value threshold. Alternatively, the turbine-compressor may operate in the second mode of operation responsive to the vehicle and/or vehicle system operating at an operating parameter that has an operating parameter value that is less than an operating parameter value threshold. The turbine-compressor assembly may switch between operating in the first mode of operation and the second mode of operation during transient operation of the reciprocating engine dictated by power demands of the vehicle. During transient operations of increased power or load to reduced power or load, the controller may direct the assembly to operate in the first mode of operation. During transient operations of reduced power or load to increased power or load, the controller may direct the assembly to operate in the second mode of operation.

Figure 5:
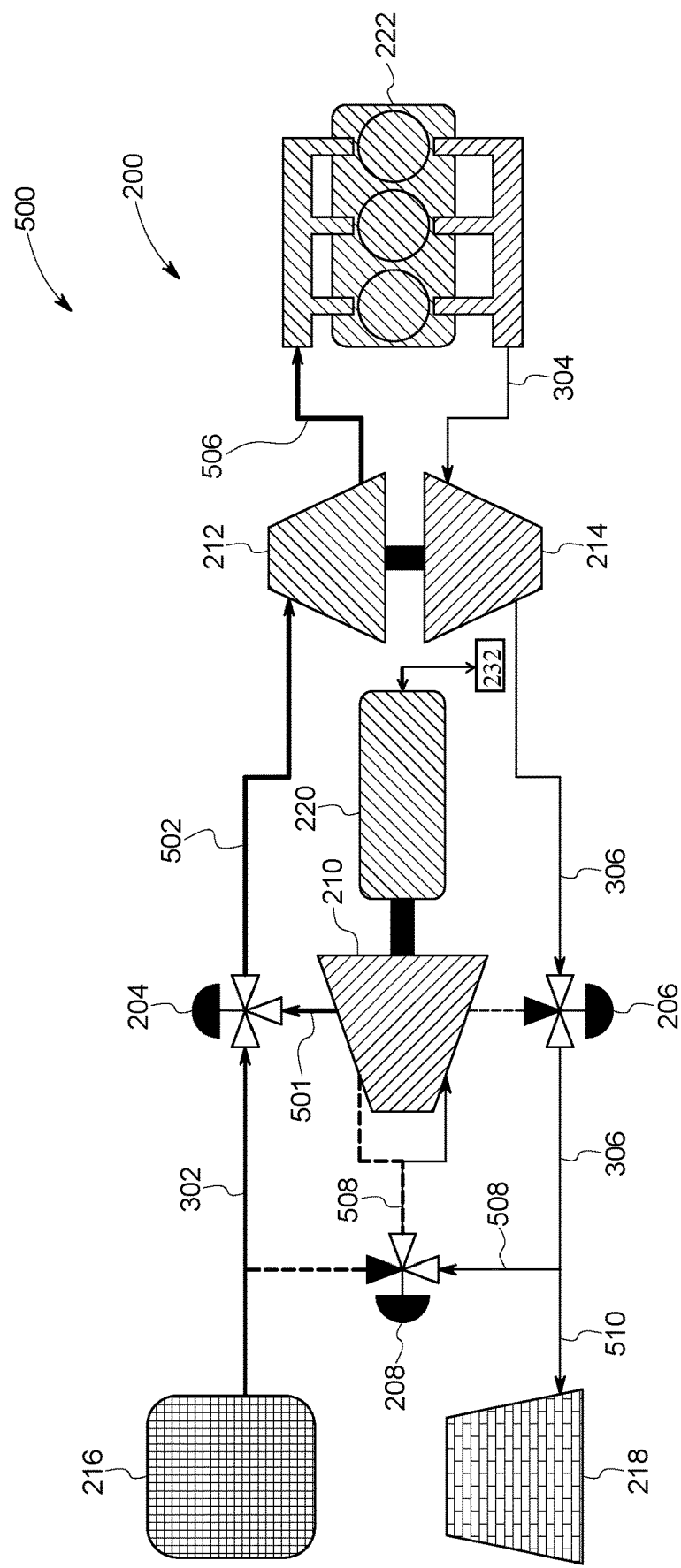
FIG. 5 illustrates one embodiment of the turbine-compressor assembly shown in FIG. 2 operating in a pump mode of operation.

In one or more embodiments, the turbine-compressor assembly may operate in an alternative mode of operation. For example, FIG. 5 illustrates one embodiment of the turbine-compressor assembly operating in a pump mode of operation 500. While the assembly operates in the pump mode of operation, the turbine-compressor device operates as a pump or an exhaust gas recirculation (EGR) pump. Additionally, the power device operates in the motor mode of operation and provides power to drive the device. The inlet air is directed from the inlet to the upstream valve. Additionally, the turbine-compressor device operating in the pump mode of operation directs pump exhaust 501 to the upstream valve that is combined with the inlet air. The upstream valve directs a pump inlet air mixture 502 from the upstream valve to the compressor.

The engine or heat source exhaust is expelled from the turbine engine and is directed to the turbine, and first turbine exhaust is directed to the downstream valve. The control valve directs a first portion 508 of the first turbine exhaust to the turbine-compressor device and directs a second portion 510 of the first turbine exhaust to the outlet. For example, the first portion of the first turbine exhaust is directed to the turbine-compressor device (operating as the exhaust pump in the pump mode of operation), and directs the pump exhaust into the inlet air. The second portion of the first turbine exhaust is directed to the outlet. The first portion and the second portion may have common or unique volumes. In one embodiment, compressed gas may be routed to a pressure container such as a compressed air braking system.

In one or more embodiments, the turbine-compressor assembly may include an alternative engine or other power generating device. For example, the engine may be referred to as an exhaust gas recirculation (EGR) engine, and the control valve may control the direction of flow of fluids within the assembly. The control valve may control the turbine-compressor assembly to operate in an EGR metering mode of operation. For example, a designated minimum amount of power may be transferred and exhaust gas may be metered to an intake. Alternatively, the engine may be an alternative device, and the assembly may no longer require the control valve to control the direction of flow of fluids within the system. For example, the turbine-compressor device may move to a location upstream of the turbine. One or more valves may control the direction of flow of fluids within the assembly to operate the turbine-compressor device in a turbine-mode of operation to provide power to the engine without a pump or control valve.

In the illustrated embodiments of FIGS. 3-5, the turbocharger and turbine-compressor assembly are illustrated having a similar piping configuration. In one or more embodiments, the turbine-compressor assembly may have an alternative piping or conduit configuration. For example, the connections between the turbine-compressor device and the turbine, compressor, and engine (e.g., the turbocharger) may vary. As one example, the turbine-compressor device could be fluidly coupled with the turbocharger at a location that is upstream of the turbocharger. As another example, the turbine-compressor device could be fluidly coupled with the turbocharger at a location that is downstream of the turbocharger. In one or more embodiments, the turbine-compressor assembly may include conduits or piping with plural valves that may allow the turbine-compressor device to be fluidly coupled upstream or downstream of the turbocharger, and control of the valves may change whether the turbine-compressor device is located upstream or downstream of the turbocharger.

Figure 6:
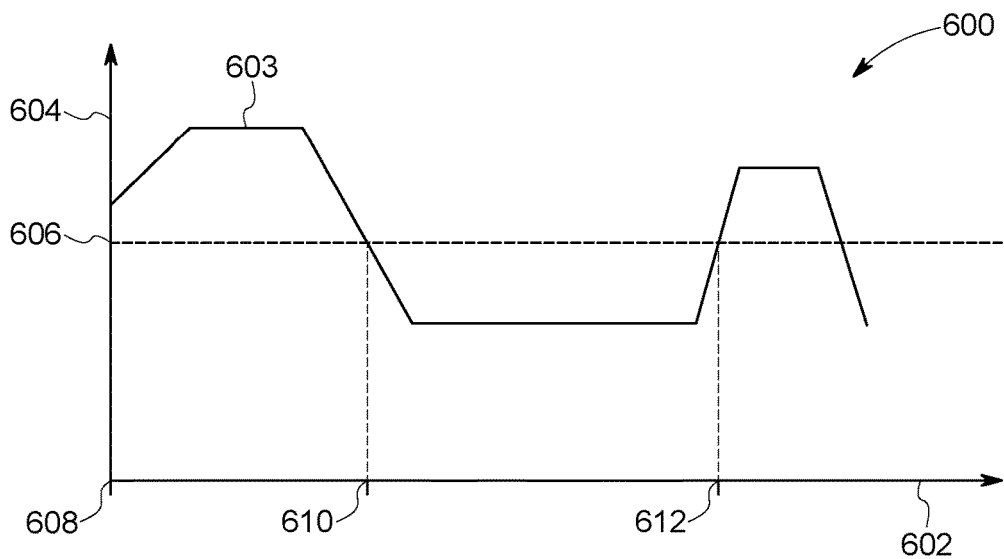
FIG. 6 illustrates one embodiment of a graph of a turbine-compressor assembly operating in a first mode of operation or a second mode of operation.

FIG. 6 illustrates one embodiment of a graph 600 of the turbine-compressor assembly operating in the first mode of operation or the second mode of operation. The graph shows a horizontal axis 602 representing increasing time as the vehicle moving along the route. A vertical axis 604 represents increasing operating parameter values. An operating parameter value line 603 indicates one example of a changing operating parameter value of the vehicle as the vehicle moves along the route. In one example, the operating parameter value line 603 may represent the engine load of the vehicle as the vehicle moves along the route. Alternatively, the line 603 may indicate a different operating parameter of the vehicle, may indicate a combined operating parameter of plural vehicles of a consist of the vehicle system, or the like.

A horizontal threshold line 606 indicates an operating parameter value threshold. In the illustrated embodiment, the threshold line 606 indicating the operating parameter value threshold is substantially constant. Optionally, the threshold line 606 may vary as the vehicle moves along the route. As the vehicle moves along the route, the turbine-compressor assembly switches between operating in the first mode of operation or the second mode of operation based on the operating parameter (e.g., engine load) of the vehicle system. While the vehicle is operating at an operating parameter value that is greater than the horizontal threshold line 606 (e.g., the line 603 is above the threshold line 606), the turbine-compressor assembly operates in the first mode of operation. While the line 603 is below the threshold line 606 and the vehicle operates at an operating parameter value that is less than the horizontal threshold line 606, the turbine-compressor assembly operates in the second mode of operation.

As the vehicle moves along the route or track, the turbine-compressor assembly switches between operating in the first mode of operation or in the second mode of operation. From a first time 608 to a subsequent second time 610, the engine load is greater than the engine load threshold (e.g., the line 603 is above the threshold line 606) and the turbine-compressor assembly operates in the first mode of operation. For example, the turbine and the turbine-compressor device (e.g., operating as the turbine) may extract a sufficient amount of exhaust energy to produce a sufficient amount of compressed air pressure for the engine.

From the second time 610 to a subsequent third time 612, the vehicle operates with an engine load that is less than the engine load threshold (e.g., the line 603 is below the threshold line 606). For example, an insufficient amount of exhaust energy may be available to increase the engine combustion air pressure responsive to the assembly operating in the first mode of operation. In order to extract a sufficient amount of energy to produce a sufficient amount of air pressure for the engine, the turbine-compressor assembly switches from operating in the first mode of operation to operating in the second mode of operation. The one or more processors of the vehicle system may control the operation of the turbine-compressor device to change the direction of rotation of the wheel (e.g., the device fan) of the turbine-compressor device and change the position of each of the switches of the upstream valve, the downstream valve, and the control valve to change the flow of the fluid within the turbine-compressor assembly in order to operate the turbine-compressor device in the second mode of operation.

The turbine assembly, operating in the second mode of operation, compresses the air with the turbine-compressor device and the compressor. The compressor and the turbine-compressor device (e.g., operating as the compressor) may compress the air to provide a sufficient amount of compressed air pressure for the engine. For example, the turbine-compressor device (e.g., operating as the compressor) and the compressor increase the air pressure to a sufficient amount to increase the power output and to improve the efficiency of the engine operating at the engine loads that are less than the engine load threshold (e.g., the line threshold 606). The turbine-compressor assembly may switch from operating in the first mode of operation to operating in the second mode of operation (e.g., use the power device as the motor by extracting stored electric energy or power from the storage device or other power source and use the turbine-compressor device as the compressor) to increase the air pressure of the compressed air to the engine while the vehicle is operating at a reduced or decreased load operating condition to enable increase power delivery to reach the power threshold 606.

The vehicle and/or one or more systems off-board the vehicle system may monitor (e.g., continuously, intermittently, or the like) the one or more operating parameters with the sensors onboard the vehicle or one or more sensors off-board the vehicle. Additionally, the one or more processors of the vehicle may change the operation of the assembly based on the one or more monitored operating parameters. In one or more embodiments, the one or more processors may automatically change the operation of the turbine-compressor assembly from one of the turbine operating mode or compressor operating mode to the other of the turbine or compressor operating modes. For example, the one or more processors may include software or software packages that direct the turbine-compressor assembly when to switch between operating in the first mode of operation or operating in the second mode of operation. Additionally or alternatively, an operator onboard or off-board the vehicle may manually change the operation of the turbine-compressor assembly via the input and/or output devices.

In one or more embodiments, the turbine-compressor assembly may switch between operating in the first mode of operation or in the second mode of operation if an air-to-fuel ratio is greater than or less than an air-to-fuel ratio value threshold. Optionally, the turbine-compressor assembly may switch between the different operating modes if a temperature of the engine or heat source exhaust is greater than or less than a temperature value threshold. Optionally, the turbine-compressor assembly may switch between the different operating modes if the flow rate of fuel to the engine is greater than or less than a flow rate value threshold. Optionally, the turbine-compressor assembly may switch between the different operating modes based on two or more different operating parameters. Optionally, the turbine-compressor may be bypassed so that no power is transferred to or from the motor generator.

Changing the operation of the turbine-compressor assembly may increase the efficiency of the reciprocating engine relative to the turbine-compressor assembly not changing operations. For example, changing the turbine-compressor device from operating as the turbine or the compressor enables an increase of engine combustion air pressure at low engine loads. Increasing the engine combustion air pressure with the compressor reduces an amount of emissions the vehicle, the vehicle system, and/or the powered system may expel and improves the efficiency of the engine relative to the turbine engine not including the turbine-compressor device. Additionally or alternatively, the operation of the turbine-compressor assembly may be changed independent of changing the engine speed or engine load, for example by changing a notch setting of the propulsion system of the vehicle. For example, the assembly may increase engine combustion air pressure without concurrently changing the speed of the engine or the engine load.

Figure 7:
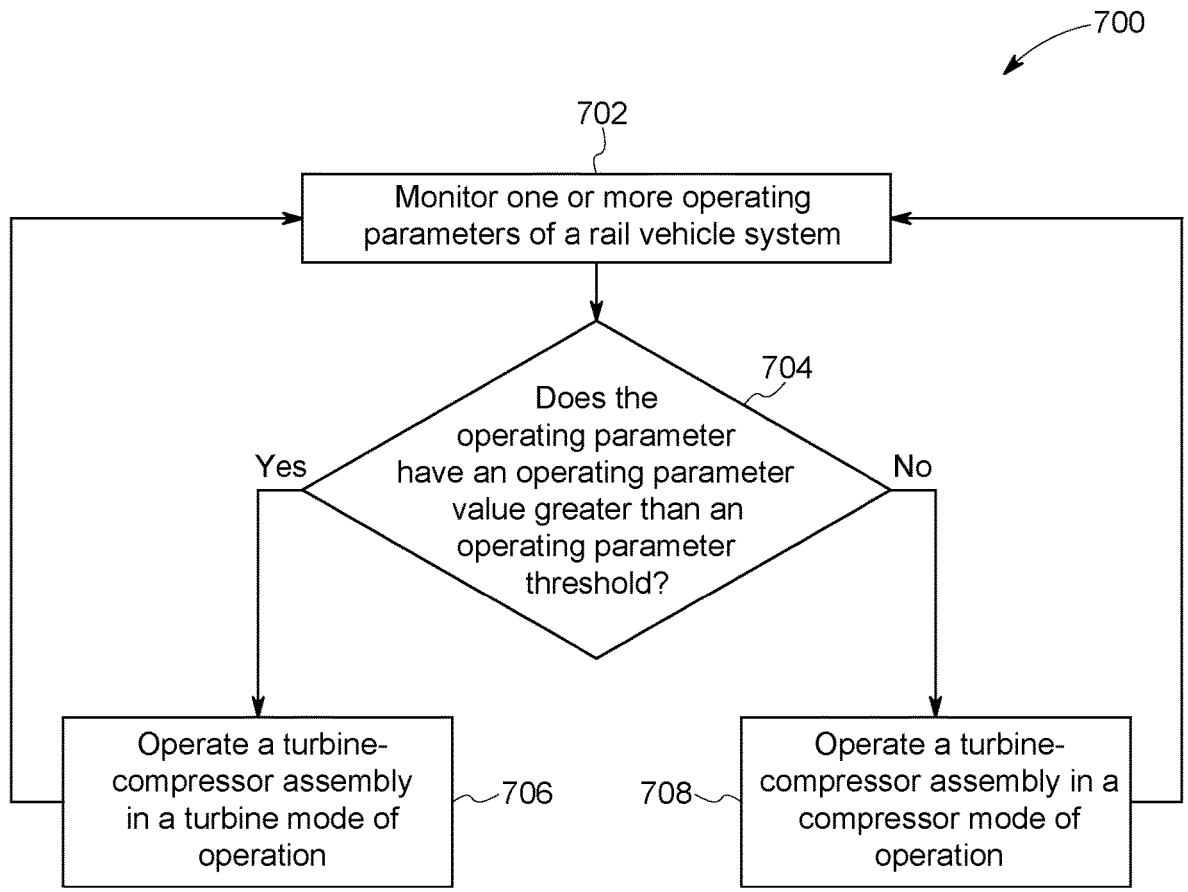
FIG. 7 is a flowchart of one embodiment of a method for controlling operation of a turbine-compressor assembly.

FIG. 7 illustrates a flowchart 700 of one embodiment of a method for controlling operation of the turbine-compressor assembly. At step 702, as the vehicle moves along the route, the one or more processors monitor measurements of one or more operating parameters of the vehicle, the vehicle system, and/or the turbine-compressor assembly measured by the one or more sensors. For example, the sensors may measure the speed of the vehicle, identify the location of the vehicle and/or vehicle system, air-to-fuel ratio, exhaust temperatures, engine load, the rate of fuel flow, engine speed, pressures, or the like. Optionally, the system may be a stationary powered system, and the one or more processors may monitor measurements of the one or more operating parameters of the stationary powered system.

At step 704, the one or more processors determine if the operating parameter has an operating parameter value that is greater than an operating parameter threshold. For example, the operating parameter may be engine load, air-to-fuel ratio of the engine, exhaust temperature, fuel flow, engine speed, pressure(s), calculated or estimated emissions value, intake manifold pressure, or the like. If the operating parameter of vehicle has an operating parameter value that is greater than the operating parameter threshold, then flow of the method proceeds to step 706. Alternatively, if the operating parameter of vehicle has an operating parameter value that is less than the operating parameter threshold, then flow of the method proceeds to step 708. For example, if the engine load of the vehicle system is greater than an engine load threshold, then flow of the method proceeds toward step 706. If the engine load is less than the engine load threshold, then flow of the method proceeds to step 708.

At step 706, the turbine-compressor assembly operates in the first mode of operation. As one example, the one or more processors may change the direction of rotation of the wheel or fan of the turbine-compressor device to operate as the turbine that generates power for the power device operating in the generator mode of operation and adding electrical energy to the storage device or another power consumption device. Additionally, the one or more processors change the position of each of the switches of the upstream valve, the downstream valve, and the control valve (e.g., as shown in FIG. 3) to change the flow of fluid within the turbine-compressor assembly in order to operate the turbine-compressor device in the first mode of operation. Optionally, the turbine-compressor device may be devoid a fan or wheel, and the one or more processors may change positions of one or more of the valves to change the direction of electrical power flow. While the turbine-compressor assembly operates in the first mode of operation, the turbine and the turbine-compressor device extract energy from the engine or heat source exhaust, and generate electrical power that is directed to the power device. Flow of the method returns to step 702 and the continues as the vehicle moves along the route.

Alternatively, at step 708, the turbine-compressor assembly operates in the second mode of operation. For example, the one or more processors may change the direction of rotation of the fan or wheel of the turbine-compressor device to operate as the compressor that is driven by the power device operating in the motor mode of operation by extracting stored electrical energy from the storage device or from another power source. Optionally, the turbine-compressor device may be devoid a fan or wheel, and the one or more processors may change the position of each of the switches of the upstream valve, the downstream valve, and the control valve (e.g., as shown in FIG. 4) to change the flow of fluid within the turbine-compressor assembly in order to change the direction of electrical power flow to operate the turbine-compressor device in the second mode of operation. While the turbine-compressor assembly operates in the second mode of operation, the compressor and the turbine-compressor device compress the inlet air that is directed to the engine. Additionally, the power device provides electrical power to the turbine-compressor device, that is consumed by the turbine-compressor device, while the turbine-compressor assembly operates in the second mode of operation. Flow of the method returns to step 702 and the continues as the vehicle moves along the route.

In one or more embodiments, the turbine-compressor assembly may operate in the pump mode of operation. For example, the one or more processors may change the direction of rotation of the fan of the turbine-compressor device and/or change the position of one or more switches of valves to operate as the pump that is driven by the power device. For example, the one or more processors may change the position of each of the switches of the upstream valve, the downstream valve, and the control valve (e.g., as shown in FIG. 5) to change the flow of fluid within the assembly in order to operate the turbine-compressor device in the pump mode of operation. While the assembly operates in the pump mode of operation, the control valve directs the first portion 508 of the first turbine exhaust to the turbine-compressor device that is pumped into and mixed with the inlet air, and the control valve directs the second portion 510 of the first turbine exhaust to the outlet.

In one embodiment, a method includes operating a turbine-compressor assembly in a first mode of operation or a second mode of operation, and selectively switching therebetween. In the first mode of operation electrical power is directed to a power device, and thereby a speed of turbine-compressor assembly is increased. In the second mode of operation, receiving electrical power generated by the power device at the turbine-compressor device, and thereby the speed of the turbine-compressor assembly is decreased.

The controller may respond to the speed of the turbine-compressor device being outside of a determine range of speed, the speed of the turbine-compressor device via the power device. It may control the speed of the turbine-compressor by, for example, providing power to the power device to increase the speed of the turbine-compressor device to be above a determined lower threshold value. The controller may respond to the speed of the turbine-compressor by generating power using the power device to decrease the speed of the turbine-compressor device to be below a determined upper threshold value. The generation of power by the power device acts as a brake or drag on the speed of the shaft of the turbine-compressor assembly. In this way, the controller may actively keep the turbocharger from stalling or choking. During idle, the turbocharger may need a boost to keep the speed within the operating envelop. During heavy engine loads, the turbocharger may need braking to keep it from overspeeding. Within the operating speed range, the controller may selectively apply load to the power device to extract a select amount of power. In this manner, the braking (or boost) effect is not all or none, but rather can be a gradient and fine tuned by the controller.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

In at least one embodiment, a turbine-compressor assembly of a system having an engine includes an upstream valve fluidly coupled with both a compressor and a turbine-compressor device, a downstream valve fluidly coupled with a turbine and the turbine-compressor device, and a controller that can control the upstream valve, the downstream valve, and a control valve that is coupled with the upstream valve, the downstream valve, and the turbine-compressor device. The controller being can selectively operate the turbine-compressor device in one of a plurality of operating modes In a first mode of operation, the upstream valve is controlled to direct inlet air to the compressor, the turbine is controlled to receive engine exhaust, the downstream valve is controlled to direct first turbine exhaust from the turbine to the turbine-compressor device, and the control valve is controlled to direct second turbine exhaust from the turbine-compressor device to an outlet of the system. In a second mode of operation, the control valve is controlled to direct the inlet air to the turbine-compressor device, the upstream valve is controlled to direct first compressed air from the turbine-compressor device to the compressor, and the downstream valve is controlled to direct the first turbine exhaust from the turbine to the outlet of the system.

Optionally, wherein, the plurality of operating modes further includes a pump mode of operation of the turbine-compressor device, in which the upstream valve is controlled to direct a pump inlet air mixture to the compressor, and the control valve is controlled to direct at least a portion of the first turbine exhaust to the turbine-compressor device and direct at least a portion of the first turbine exhaust to the outlet of the system. Optionally, in the second mode of operation, the upstream valve is controlled to direct the first compressed air from the turbine-compressor device to the compressor, and the compressor is controlled to direct second compressed air from the compressor to the engine.

Optionally, the assembly also includes a power device coupled with the turbine-compressor device. The turbine-compressor device can transfer torque to the power device to generate power while the turbine-compressor device is operating in the first mode of operation, and the power device can consume power and transfer torque to the turbine-compressor device while the turbine-compressor device is operating in the second mode of operation. Optionally, the power device operates in a generator mode of operation while the turbine-compressor device is operating in the first mode of operation, and the power device operates in a motor mode of operation while the turbine-compressor device is operating in the second mode of operation. Optionally, the turbine-compressor device can operate in the first mode of operation while the system is operating at a first operating parameter while an operating parameter value is greater than an operating parameter value threshold, and at a second operating parameter while the operating parameter value is less than the operating parameter value threshold. Optionally, the turbine-compressor device can operate in the second mode of operation while the system is operating at an engine speed that is lower than the operator parameter value threshold. Optionally, in the second mode of operation, the outlet of the system is a pressure tank coupled to a compressed air system. Optionally, the turbine-compressor device automatically switches between the turbine-compressor device operating in the first mode of operation or operating in the second mode of operation as the system travels along a route. Optionally, the compressor is a radial compressor, and the turbine is a radial exhaust turbine.

In at least one embodiment, a method includes switching between operating a turbine-compressor assembly of a system at least in a first mode of operation and a second mode of operation. In the first mode of operation, directing inlet air to a compressor, receiving engine exhaust at a turbine, directing first turbine exhaust from the turbine to a turbine-compressor device, and directing second turbine exhaust from the turbine-compressor device to an outlet of the system. In the second mode of operation, directing the inlet air to the turbine-compressor device, directing first compressed air from the turbine-compressor device to the compressor, and directing the first turbine exhaust from the turbine to the outlet of the system.

Optionally, the method further comprises switching to a pump mode of operation, and in the pump mode of operation in which a pump inlet air mixture is directed to the compressor, and at least a portion of the first turbine exhaust is directed to the turbine-compressor device and at least a portion of the first turbine exhaust is directed to the outlet of the system. Optionally, the method also includes directing the first compressed air from the turbine-compressor device to the compressor and directing second compressed air of the compressed air of the compressed air from the compressor to an engine while the turbine-compressor device is operating in the second mode of operation. Optionally, the method also includes generating power with a power device coupled with the turbine-compressor device while the turbine-compressor device is operating in the first mode of operation. Optionally, the method also includes consuming power with a power device coupled with the turbine-compressor device while the turbine-compressor device is operating in the second mode of operation. Optionally, the method also includes operating the turbine-compressor device in the first mode of operation while the system is operating at an operating parameter having an operating parameter value that is greater than an operating parameter value threshold, and operating the turbine-compressor device in the second mode of operation while the system is operating at an operating parameter having an operating parameter value that is less than the operating parameter value threshold.

In at least one embodiment, a turbine-compressor assembly of a vehicle system has an engine that includes a valving system coupled with a compressor, a turbine, and a turbine-compressor device, a power device coupled with the turbine-compressor device, and a controller that can control the valving system to selectively switch between two or more operating modes of the turbine-compressor device. In a first mode of operation, the valve system can direct inlet air to the compressor, the turbine can receive engine exhaust, direct first turbine exhaust from the turbine to the turbine-compressor device, direct second turbine exhaust from the turbine-compressor device to an outlet of the vehicle system, and generate electrical power for the power device. In a second mode of operation, the valve system can direct the inlet air to the turbine-compressor device, direct first compressed air from the turbine-compressor device to the compressor, direct the first turbine exhaust from the turbine to the outlet of the vehicle system, and the consume electrical power of the power device to compress the inlet air by the turbine-compressor device.

Optionally, the turbine-compressor device operates in a pump mode of operation, wherein the controller can switch to the pump mode of operation to direct compressed air from the compressor. Optionally, in the first mode of operation, an energy storage device can store the generated electrical power. Optionally, in the second mode of operation, the controller boosts performance of the compressor using the power device while a speed of the engine is below a threshold speed value. Optionally, the turbine-compressor device be operably coupled with a variable nozzle ring to control an amount of turbine shaft power based on engine operating conditions. Optionally, the controller may control operation of the variable nozzle ring such that the controller may change a position of the variable nozzle ring between one or more open positions and a closed position. Optionally, the position of the variable nozzle ring may be manually controlled by an operator of the system. Optionally, the assembly may include a valve operably coupled with the turbine-compressor device. The valve may divert or separate the fluid out of the turbine-compressor device to move in different directions toward two or more different turbine scrolls to control an amount of turbine shaft power based on engine operating conditions. In one or more embodiments, the controller may control operation of the valve to separate the fluid to move in different directions. Optionally, the turbine-compressor device may provide compounding power to an engine crankshaft by being directly operably coupled with the engine crankshaft. For example, the turbine-compressor device may provide an amount of power that may be added to, compounded with, combined with, or the like, power generated by the engine. Optionally, the turbine-compressor device may provide power directly and/or indirectly to engine components, auxiliary components, or other systems operably coupled with the turbine-compressor assembly. Optionally, the turbine-compressor device may provide power directly and/or indirectly to engine components, auxiliary components, or other systems operably coupled with the turbine-compressor assembly. Optionally, one or more arrangements of the turbine-compressor assembly may be used to control an amount of turbine shaft power generated by or provided by the turbine-compressor device based on engine operating conditions. In one or more embodiments of the subject matter described herein, a turbine-compressor assembly may include a turbine-compressor device fluidly coupled with a heat source, a compressor, and a turbine via plural valves. A power device may be coupled with the turbine-compressor device. A controller may control operation of the plural valves to control movement of fluids within the assembly to selectively switch between the turbine-compressor device operating in one of plural modes. In a first mode of operation, the turbine-compressor device may generate electrical power and direct the electrical power to the power device. In a second mode of operation, the turbine-compressor device may receive electrical power from the power device to consume the electrical power. Optionally, at least one of the plural valves may be fluidly coupled with the heat source. The controller may control operation of the at least one of the plural valves fluidly coupled with the heat source based on one or more operating conditions of the power device. Optionally, the at least one of the plural valves fluidly coupled with the heat source may direct a first portion of a heat source exhaust from the heat source and toward an outlet, and direct a second portion of the heat source exhaust toward the turbine. Optionally, the controller may control operation of the at least one of the plural valves fluidly coupled with the heat source to direct a heat source exhaust from the heat source and toward an outlet. Optionally, the controller may control one or more operating settings of the turbine to control one or more of one or more characteristics of a heat source exhaust directed into the turbine or one or more characteristics of a first turbine exhaust directed out of the turbine.

Optionally, the controller may monitor one or more operating conditions of one or more of the power device or the heat source. The controller may control operation of the turbine based on the one or more operating conditions of the one or more of the power device or the heat source. Optionally, the turbine-compressor device may operate in the second mode of operation while the assembly is operating at a pressure at the heat source that is lower than an operator parameter value threshold. Optionally, the compressor may be one of a radial compressor or an axial compressor, and the turbine may be one of a radial exhaust turbine or an axial exhaust turbine. Optionally, in the first mode of operation, the turbine-compressor device may receive first turbine exhaust from the turbine, and the turbine-compressor device may direct second turbine exhaust from the turbine-compressor device toward an outlet. Optionally, in the second mode of operation, the turbine-compressor device may direct first compressed air from the turbine-compressor device toward the compressor. Optionally, the turbine-compressor assembly may include an energy storage device that may store at least some of the electrical power generated by the turbine-compressor device. Optionally, in the second mode of operation, the controller may boost performance of the compressor using the power device while a pressure at the heat source is below a threshold pressure value.

In one or more embodiments of the subject matter described herein, a method may include operating a turbine-compressor assembly in a first mode of operation or a second mode of operation. In the first mode of operation, electrical power may be generated with a turbine-compressor device, and directed to a power device. In the second mode of operation, electrical power generated by the power device may be received at the turbine-compressor device which may consume the electrical power generated by the power device.

Optionally, the method may include operating the turbine-compressor assembly in the second mode of operation while the assembly is operating at a pressure at a heat source of the turbine-compressor assembly that is lower than an operating parameter value threshold. Optionally, the method may include controlling operation of at least one of plural valves of the turbine-compressor assembly based on one or more operating conditions of the power device, that at least one of the plural valves fluidly coupled with the heat source.

Optionally, the method may include controlling operation of the at least one of the plural valves of the turbine-compressor assembly fluidly coupled with the heat source to direct a heat source exhaust from the heat source and toward an outlet based on the one or more operating conditions of the power device.

In one or more embodiments of the subject matter described herein, an expander-compressor assembly may include a valve system coupled with a compressor, an expander, a heat source, and a device. The valve system may direct plural fluids in plural directions toward one or more of the compressor, the expander, or the device. A power device may be coupled with the device, and a controller may control the valve system to selectively switch between the device operating in one of plural operating modes. In an expander mode of operation, the valve system may control movement of the plural fluids to operate the device as a power-generating device to generate electrical power for the power device. In a second mode of operation, the valve system may control movement of the plural fluids to operate the device as a power-consuming device. The device may consume electrical power received from the power device.

Optionally, at least one of plural valves of the valve system may be fluidly coupled with the heat source. The controller may control operation of the at least one of the plural valves fluidly coupled with the heat source based on one or more operating conditions of the power device. Optionally, the controller may control one or more operating settings of the turbine to control one or more of one or more characteristics of a heat source exhaust directed into the turbine or one or more characteristics of a first turbine exhaust directed out of the turbine. Optionally, the controller may monitor one or more operating conditions of one or more of the power device or the heat source, and may control operation of the turbine based on the one or more operating conditions of the one or more of the power device or the heat source.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine-compressor assembly, comprising:
   a turbine-compressor device fluidly coupled with a heat source, a compressor, and a turbine via plural valves;
   a power device coupled with the turbine-compressor device via a shaft; and
   a controller configured to control operation of the plural valves to control the movement of fluids within the assembly to selectively switch between the turbine-compressor device operating in one of plural operating modes, and:
   in a first mode of operation, the turbine-compressor device is configured to selectively generate a determined amount of electrical power, and
   in a second mode of operation, the turbine-compressor device is configured to selectively receive a determined amount of electrical power.

2. The turbine-compressor assembly of claim 1, wherein the controller is configured to control the amount of electrical power extracted from the shaft by the power device while the turbine-compressor device operates in the first mode of operation or the amount of electrical power provided to the shaft by the power device while the turbine-compressor device operates in the second mode of operation based on at least one of a speed of an electric turbocharger or an exhaust gas temperature.

3. The turbine-compressor assembly of claim 2, wherein the controller is further configured to increase the amount of electrical power extracted from the shaft by the power device in response to at least one of the exhaust gas temperature decreasing below a lower threshold temperature, a cylinder pressure increasing above a threshold pressure while the exhaust gas temperature is less than an upper threshold temperature, or the speed of the electric turbocharger increasing above a threshold speed while the exhaust gas temperature is less than the upper threshold temperature.

4. The turbine-compressor assembly of claim 3, wherein the controller is further configured to decrease the amount of power extracted from the shaft by the power device in response to the exhaust gas temperature increasing above the upper threshold temperature while the speed of the electric turbocharger is less than the threshold speed and the cylinder pressure is less than the threshold pressure.

5. The turbine-compressor assembly of claim 2, wherein the controller is further configured to increase the amount of power provided to the shaft by the power device in response to the exhaust gas temperature increasing above an upper threshold temperature while the speed of the electric turbocharger is less than a threshold speed and a cylinder pressure is less than a threshold pressure, and the controller configured to decrease the amount of power provided to the shaft by the power device in response to at least one of the exhaust gas temperature decreasing below a lower threshold temperature, the speed of the electric turbocharger increasing above the threshold speed while the exhaust gas temperature is less than the upper threshold temperature, and the cylinder pressure increasing above the threshold pressure while the exhaust gas temperature is less than the upper threshold temperature.

6. The turbine-compressor assembly of claim 2, wherein the controller is further configured to derate an engine fluidically coupled to the electric turbocharger in response to the exhaust gas temperature increasing above an upper threshold temperature while the speed of the electric turbocharger is greater than a threshold speed or while a cylinder pressure is greater than a threshold pressure.

7. The turbine-compressor assembly of claim 1, wherein the heat source is an engine, and at least one of the plural valves is fluidly coupled with the engine, and the controller is further configured to control operation of the at least one of the plural valves fluidly coupled with the engine based on one or more operating conditions of the power device.

8. The turbine-compressor assembly of claim 7, wherein the at least one of the plural valves fluidly coupled with the heat source is configured to direct a first portion of a heat source exhaust from the heat source and toward an outlet, and direct a second portion of the heat source exhaust toward the turbine.

9. The turbine-compressor assembly of claim 7, wherein the controller is configured to monitor one or more operating conditions of one or more of the power device, the engine, or a vehicle that includes the turbine-compressor assembly, the controller configured to control operation of one or more of the power device, the engine, or the vehicle based on the one or more monitored operating conditions.

10. The turbine-compressor assembly of claim 1, wherein the turbine-compressor device is configured to operate in the second mode of operation while the assembly is operating at a pressure at the heat source that is lower than an operator parameter value threshold.

11. The turbine-compressor assembly of claim 1, wherein the compressor is one of a radial compressor or an axial compressor, and the turbine is one of a radial exhaust turbine or an axial exhaust turbine.

12. The turbine-compressor assembly of claim 1, wherein, in the first mode of operation, the turbine-compressor device is configured to receive first turbine exhaust from the turbine, and the turbine-compressor device is configured to direct second turbine exhaust from the turbine-compressor device toward an outlet.

13. The turbine-compressor assembly of claim 1, further comprising an energy storage device configured to store at least some of the electrical power generated by the turbine-compressor device.

14. A method comprising:
operating a turbine-compressor assembly in a first mode of operation or a second mode of operation, in which:
in the first mode of operation, electrical power generated by a turbine- compressor device is directed to a power device via a shaft, and thereby a speed of the turbine-compressor device is increased; and
in the second mode of operation, electrical power generated by the power device is received at the turbine-compressor device via the shaft, and thereby the speed of the turbine-compressor device is decreased; and
controlling an amount of the electrical power extracted from the shaft by the power device while the turbine-compressor assembly operates in the first mode of operation or controlling an amount of the electrical power provided to the shaft by the power device while the turbine-compressor assembly operates in the second mode of operation based at least in part on an exhaust gas temperature of a heat source fluidly coupled with the turbine-compressor device.

15. The method of claim 14, further comprising controlling the speed of the turbine-compressor device via the power device in response to the speed of the turbine-compressor device being outside of a determined range of speed.

16. The method of claim 15, wherein controlling the speed of the turbine-compressor device comprises providing power to the power device to increase the speed of the turbine-compressor device to be above a determined lower threshold value of the determined range of speed.

17. The method of claim 15, wherein controlling the speed of the turbine-compressor comprises generating power by the power device to decrease the speed of the turbine-compressor device to be below a determined upper threshold value of the determined range of speed.

18. An assembly comprising:
a turbine-compressor device operably coupled with a heat source via plural valves;
a power device coupled with the turbine-compressor device; and
a controller configured to selectively switch the power device between operation in one or more operating modes based on an exhaust temperature of the heat source, the controller selecting between one or more of:

a first mode of operation in which the power device is a power-generating device configured to decrease a speed of the turbine-compressor device and to generate electrical power, and a second mode of operation in which the power device is a power-consuming device configured to increase the speed of the turbine-compressor device and to consume electrical power.

19. The assembly of claim 18, wherein the controller is further configured to monitor one or more operating conditions of one or more of the power device or a fuel cell that is coupled to the turbine-compressor device, the controller configured to control operation of the turbine-compressor device based on one or more operating conditions of the one or more of the power device or the fuel cell.

20. The assembly of claim 18, wherein the controller is further configured to respond to the exhaust temperature of an exhaust gas supplied by the heat source to an aftertreatment system operably coupled to the engine being outside of a determined threshold temperature.

* * * * *